US012130476B2

(12) United States Patent
Claessens et al.

(10) Patent No.: US 12,130,476 B2
(45) Date of Patent: Oct. 29, 2024

(54) FIBER OPTIC ADAPTER HOLDER; ASSEMBLY; AND METHOD

(71) Applicant: COMMSCOPE TECHNOLOGIES LLC, Hickory, NC (US)

(72) Inventors: Bart Mattie Claessens, Hasselt (BE); Louis Muylle, Brussels (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 511 days.

(21) Appl. No.: 17/442,900

(22) PCT Filed: Mar. 23, 2020

(86) PCT No.: PCT/US2020/024275
§ 371 (c)(1),
(2) Date: Sep. 24, 2021

(87) PCT Pub. No.: WO2020/198155
PCT Pub. Date: Oct. 1, 2020

(65) Prior Publication Data
US 2022/0171135 A1    Jun. 2, 2022

Related U.S. Application Data

(60) Provisional application No. 62/824,824, filed on Mar. 27, 2019.

(51) Int. Cl.
*G02B 6/36*    (2006.01)
*G02B 6/38*    (2006.01)

(52) U.S. Cl.
CPC ......... *G02B 6/3616* (2013.01); *G02B 6/3825* (2013.01)

(58) Field of Classification Search
CPC ............................ G02B 6/3616; G02B 6/3825
(Continued)

(56) References Cited

U.S. PATENT DOCUMENTS 5,317,663 A    5/1994  Beard et al.
6,307,997 B1  10/2001  Walters et al.
(Continued)

FOREIGN PATENT DOCUMENTS

DE    10 2016 002 423 B3    6/2017
WO    2015/120617 A1        8/2015
(Continued)

OTHER PUBLICATIONS

Extended European Search Report for Application No. 20779398.5 mailed Nov. 17, 2022.
(Continued)

*Primary Examiner* — Jerry M Blevins
(74) *Attorney, Agent, or Firm* — Merchant & Gould P.C.

(57) ABSTRACT

The present disclosure relates to a fiber optic adapter holder that includes a base member and a plurality of upright arms that extend upwardly from the base member. The plurality of upright arms together may define a pocket region that has an open, U-shape. A fiber optic adapter may be received in the open, U-shaped pocket region of the fiber optic adapter holder. When the fiber optic adapter is mounted within the pocket region of the fiber optic adapter holder, a height of the fiber optic adapter holder may be lower than or equal to a height of the fiber optic adapter.

18 Claims, 14 Drawing Sheets

(58) Field of Classification Search
USPC .......................................................... 385/134
See application file for complete search history.

(56) References Cited

U.S. PATENT DOCUMENTS

| | | | |
|---|---|---|---|
| 6,908,233 | B2 | 6/2005 | Nakajima et al. |
| 8,827,571 | B2 | 9/2014 | Allen |
| 9,632,267 | B1 | 4/2017 | Burek et al. |
| 10,444,457 | B2 | 10/2019 | Lambourn et al. |
| 2005/0232550 | A1 | 10/2005 | Nakajima et al. |
| 2016/0161695 | A1* | 6/2016 | Chen ..................... F16B 5/126 385/136 |
| 2016/0274311 | A1* | 9/2016 | Verheyden ......... G02B 6/44528 |
| 2016/0370552 | A1 | 12/2016 | Lambourn et al. |
| 2018/0284362 | A1 | 10/2018 | Kadar-Kallen et al. |
| 2018/0329152 | A1 | 11/2018 | Verheyden et al. |

FOREIGN PATENT DOCUMENTS

| | | |
|---|---|---|
| WO | 2019/160995 A1 | 8/2019 |
| WO | 2019/209643 A1 | 10/2019 |

OTHER PUBLICATIONS

International Search Report and Written Opinion of the International Searching Authority for International Patent Application No. PCT/US2020/024275 mailed Jul. 13, 2020, 8 pages.

* cited by examiner

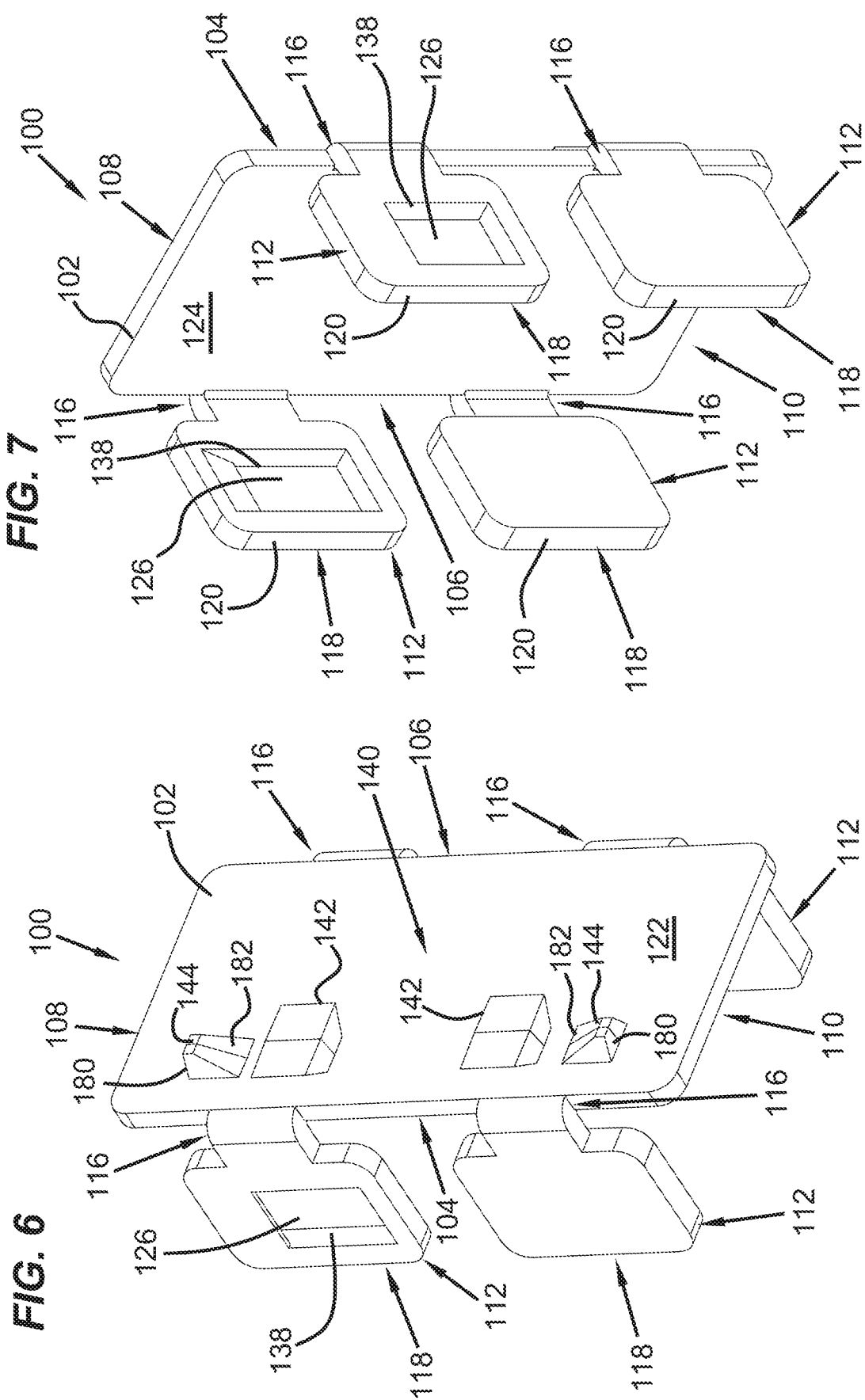

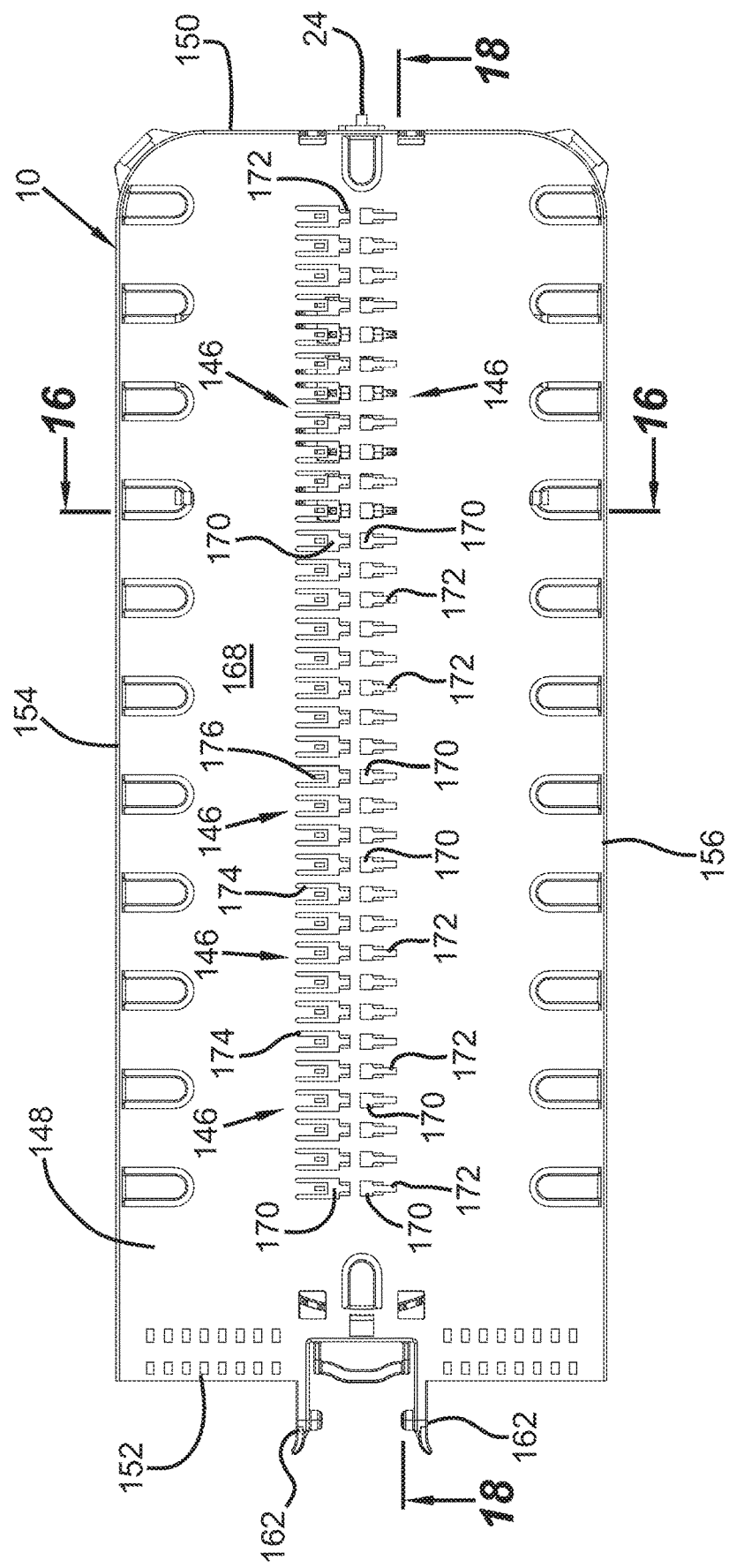

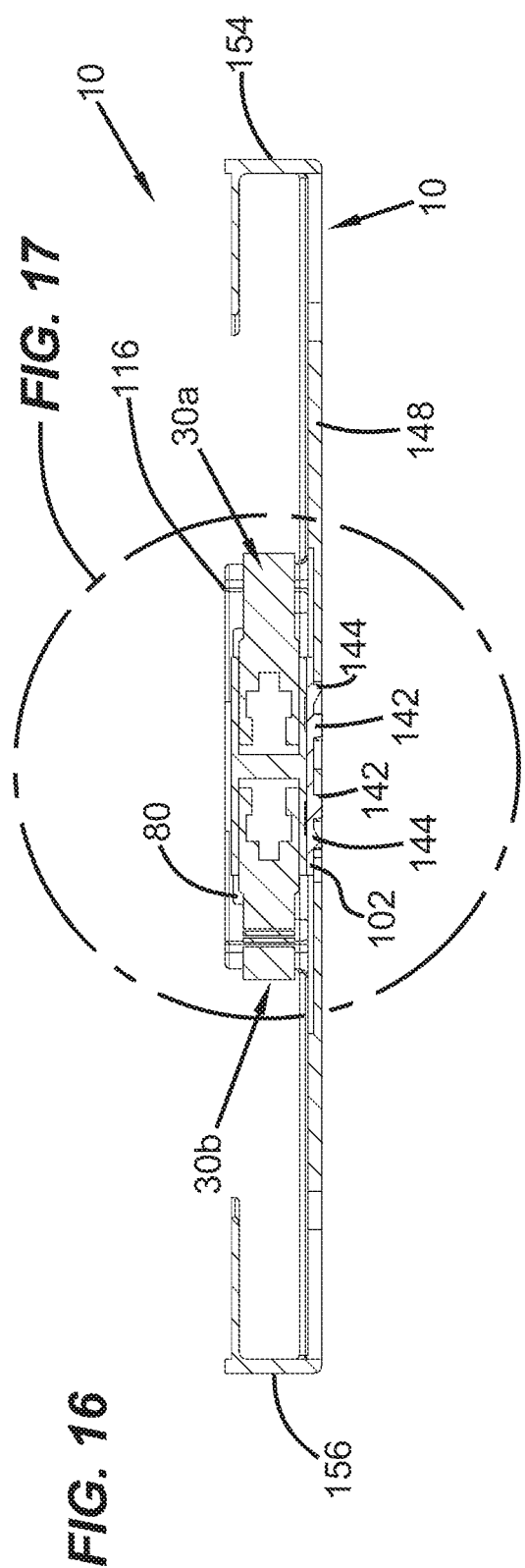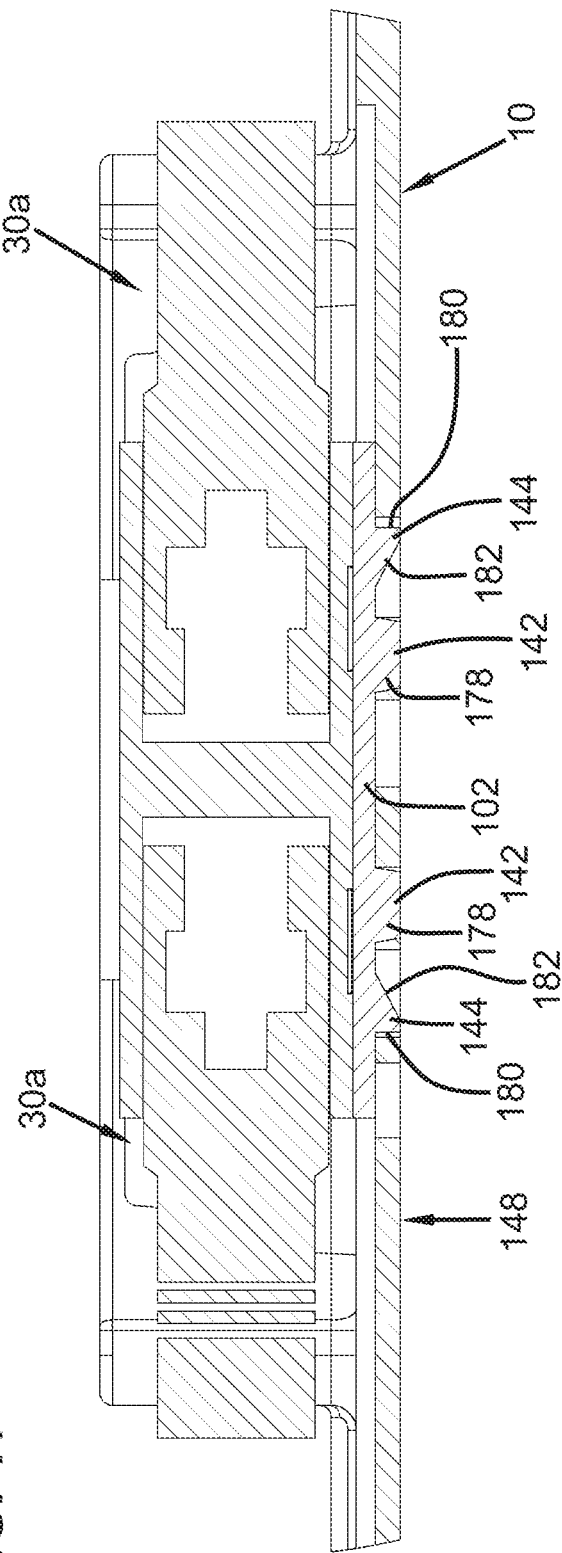

FIBER OPTIC ADAPTER HOLDER; ASSEMBLY; AND METHOD

CROSS-REFERENCE TO RELATED APPLICATION

This application is a National Stage Application of PCT/US2020/024275, filed on Mar. 23, 2020, which claims the benefit of U.S. Patent Application Ser. No. 62/824,824, filed on Mar. 27, 2019, the disclosures of which are incorporated herein by reference in their entireties. To the extent appropriate, a claim of priority to made to each of the above disclosed applications.

TECHNICAL FIELD

The present disclosure relates generally to optical fiber communications and fiber optic connector devices. More particularly, the present disclosure relates to fiber optic adapter holders, assemblies, and methods for retaining the same.

BACKGROUND

Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

Fiber optical adapters are used to optically couple together optical fiber tips of optical connectors. Fiber optical adapters can include specialized fiber alignment devices to receive bare optical fibers and align the fiber tips to enable the transfer of optical signals therebetween. Optical connectors can be secured to the fiber optical adapters when received at the ports of the fiber optical adapters.

The fiber optical adapters are normally configured to be mounted to a piece of telecommunications equipment and accessible to an operator. Improvements are desired.

SUMMARY

The present disclosure relates to a one-piece fiber optic adapter holder that can be used to retain a fiber optical adapter without adding to an overall height of the fiber optical adapter.

One aspect of the present disclosure relates to a fiber optic adapter holder that includes a base member that has a first major side, a second major side generally parallel to the first major side, a first minor side, and a second minor side oppositely disposed to the first minor side. The first minor side and the second minor side may extend generally perpendicularly between the first major side and the second major side. The base member may also include a first surface and an opposite, second surface.

The fiber optic adapter holder may include a plurality of upright arms that extend upwardly from the base member. The plurality of upright arms together may define a pocket region that has an open, U-shape.

In certain examples, the plurality of upright arms may extend upwardly at the first and second major sides of the base member. Each one of the plurality of upright arms may have a proximal end attached to the base member and a distal free end. The distal free ends may have an edge. A height of the fiber optic adapter holder may be defined between the second surface of the base member and the edge of the distal free ends of the plurality of upright arms.

A fiber optic adapter may be received in the open, U-shaped pocket region of the fiber optic adapter holder.

When the fiber optic adapter is mounted within the pocket region of the fiber optic adapter holder, the height of the fiber optic adapter holder may be lower than or equal to a height of the fiber optic adapter. That is, the fiber optic adapter may be mounted and retained within the open top pocket region of the fiber optic adapter holder such that the fiber optic adapter holder does not increase the overall height above the fiber optic adapter.

Another aspect of the present disclosure relates to a fiber optic adapter holder assembly that may include a fiber optic adapter holder, a fiber optic adapter, and a structure. The structure may include mounting locations for receiving mounting features of the fiber optic adapter holder for mounting the fiber optic adapter holder to the structure.

A further aspect of the present disclosure relates to a method of retaining a fiber optic adapter. The method may include a step of providing a one piece fiber optic adapter holder that includes a plurality of upright arms extending upwardly from a base member of the fiber optic adapter holder. The plurality of upright arms together define an open, U-shaped pocket region.

The method may include a step of mounting a fiber optic adapter within the pocket region of the fiber optic adapter holder such that when the fiber optic adapter is mounted to the fiber optic adapter holder, a length of the fiber optic adapter extends between the first and second minor sides of the base member, and a height of the fiber optic adapter extends above or is equal to a height of the fiber optic adapter holder.

The method may include a step of securing the fiber optic adapter holder to a structure via mounting features. In certain examples, the method may include a step of mounting the fiber optic adapter holder to the structure prior to mounting the fiber optic adapter within the pocket region of the fiber optic adapter holder. In certain examples, the method may include a step of mounting the fiber optic adapter holder to the structure after mounting the fiber optic adapter within the pocket region of the fiber optic adapter holder.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 4-8 are multiple views of the fiber optic adapter holder of FIG. 2 in accordance with the principles of the present disclosure;

FIG. 15 is a bottom plan view of the telecommunications equipment of FIG. 1;

FIG. 16 is a cross-sectional view of the fiber optic adapter holder assembly taken along section line 16-16 of FIG. 15;

FIG. 17 is an enlarged view of a portion of FIG. 16; and

DETAILED DESCRIPTION

Fiber optics have revolutionized communication throughout the world. Fiber optics are generally thin strings of glass designed to carry light which can be grouped together. With the increased use of fiber optics, it has become increasingly important to be able to connect and disconnect fiber optic cables from various sources. Two fiber optic cables can be optically coupled so that they are in communication with one another by using well-known connectors and adapters, thereby putting each fiber optic cable in communication with the other. The connectors are terminated to the end of each cable and then plugged into the adapters. The adapters normally include an opening at each end designed to receive the connectors. An example adapter for holding two SC-type mating connectors in axial alignment is described in U.S. Pat. No. 5,317,663.

With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter. The adapters normally include an opening at each end designed to receive the connectors.

Figure 1:
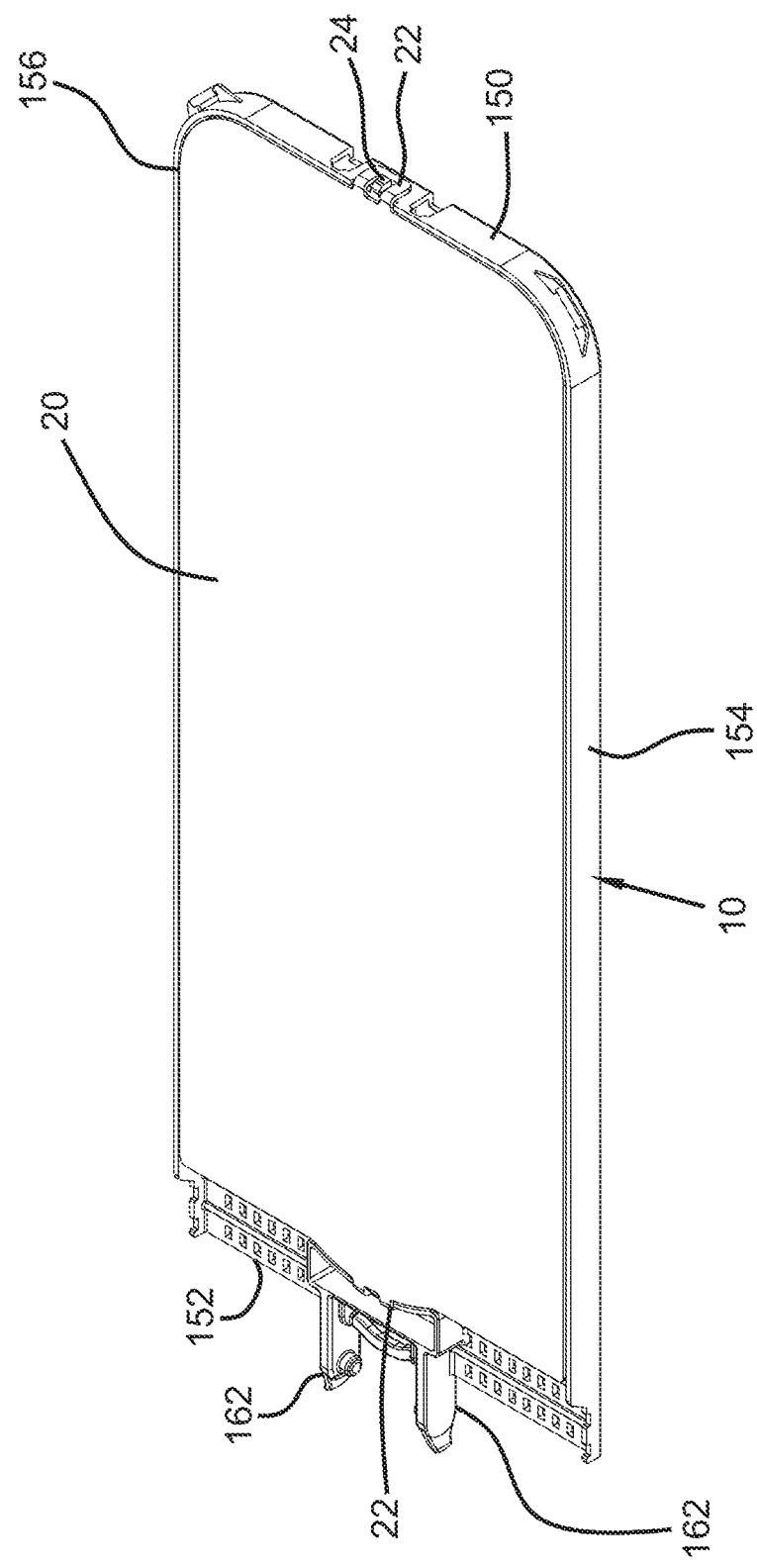
FIG. 1 is a perspective view showing an example telecommunications equipment with a cover in accordance with principles of the present disclosure.
Figure 2:
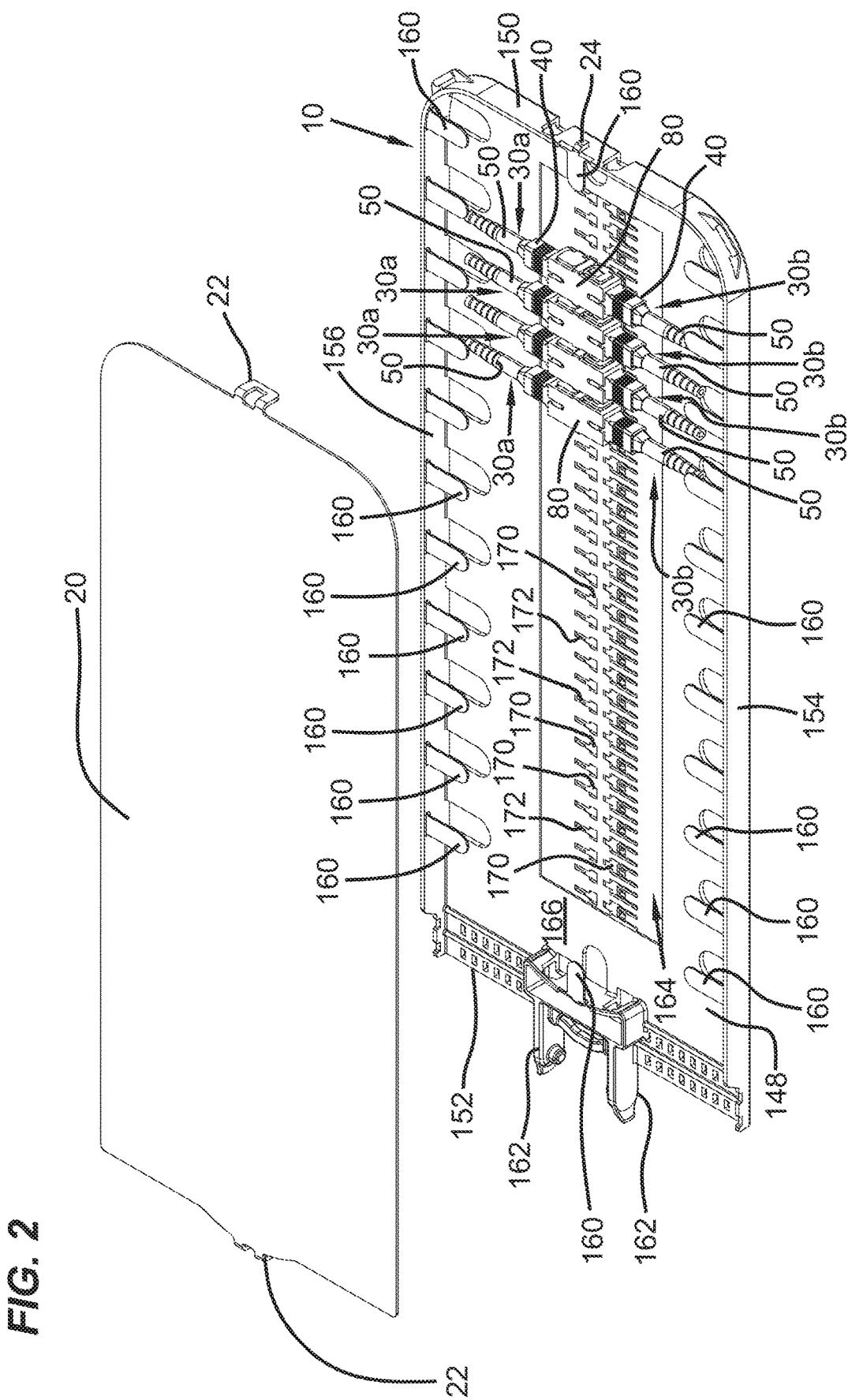
FIG. 2 is a perspective view of the telecommunications equipment of FIG. 1 with the cover removed showing a fiber optic adapter holder assembly including fiber optic connectors latched in ports of fiber optic adapters where the fiber optic adapter holders are mounted to a base member of the telecommunications equipment in accordance with the principles of the present disclosure.

FIGS. 1-2 depict an example telecommunications equipment 10. The telecommunications equipment 10 may be provided with a cover 20 for protecting the components and fiber supported within the telecommunications equipment 10. The cover 20 may include latch members 22 to form a snap-fit type of connection with a retention element 24 on the telecommunications equipment 10. In certain examples, the telecommunications equipment 10 may include a fiber management tray, plate, or other structure.

Figure 3:
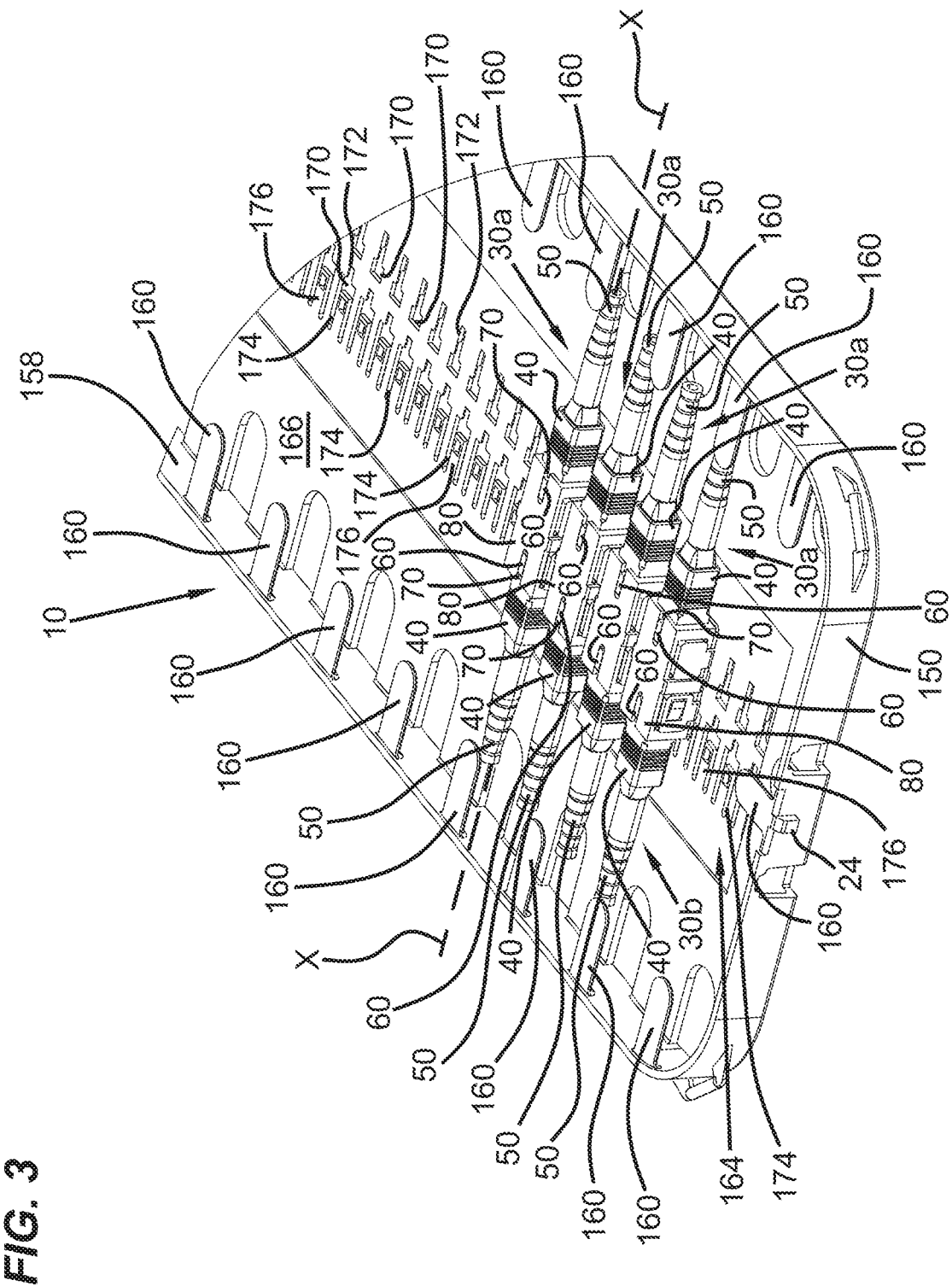
FIG. 3 is a perspective view of an enlarged portion of the telecommunications equipment of FIG. 2.
Figure 5:
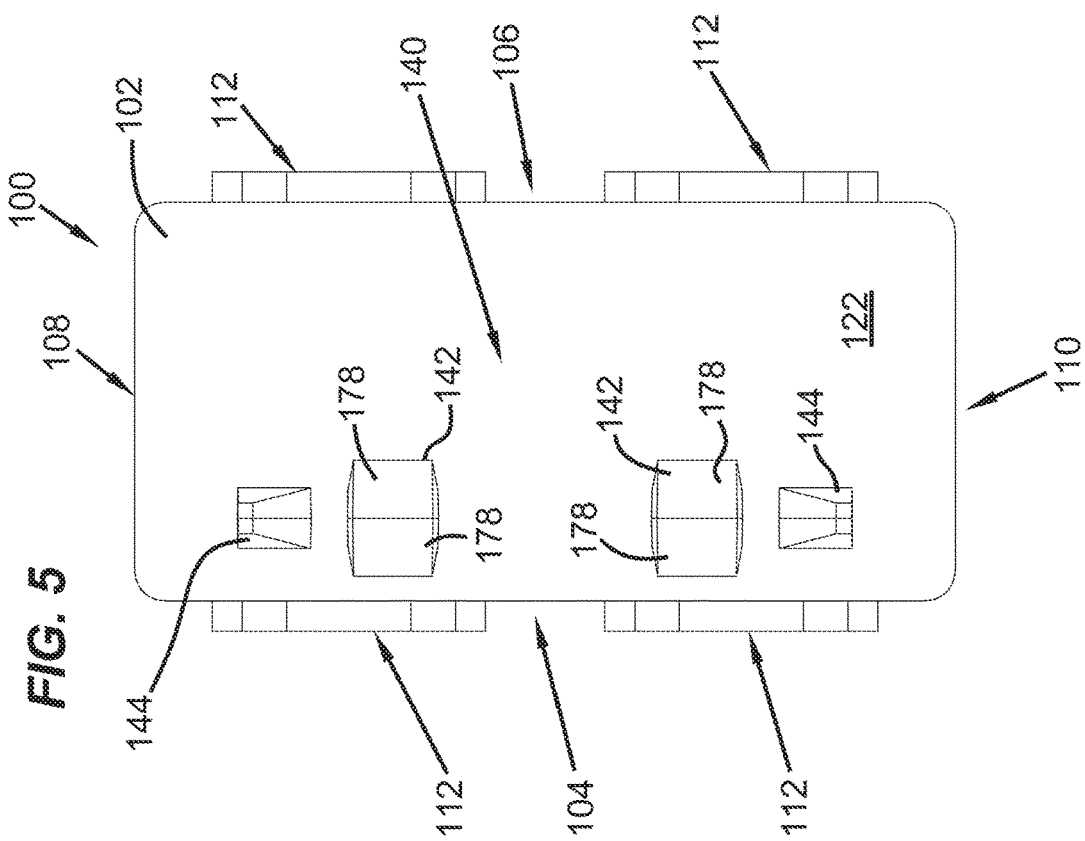
Figure 4:
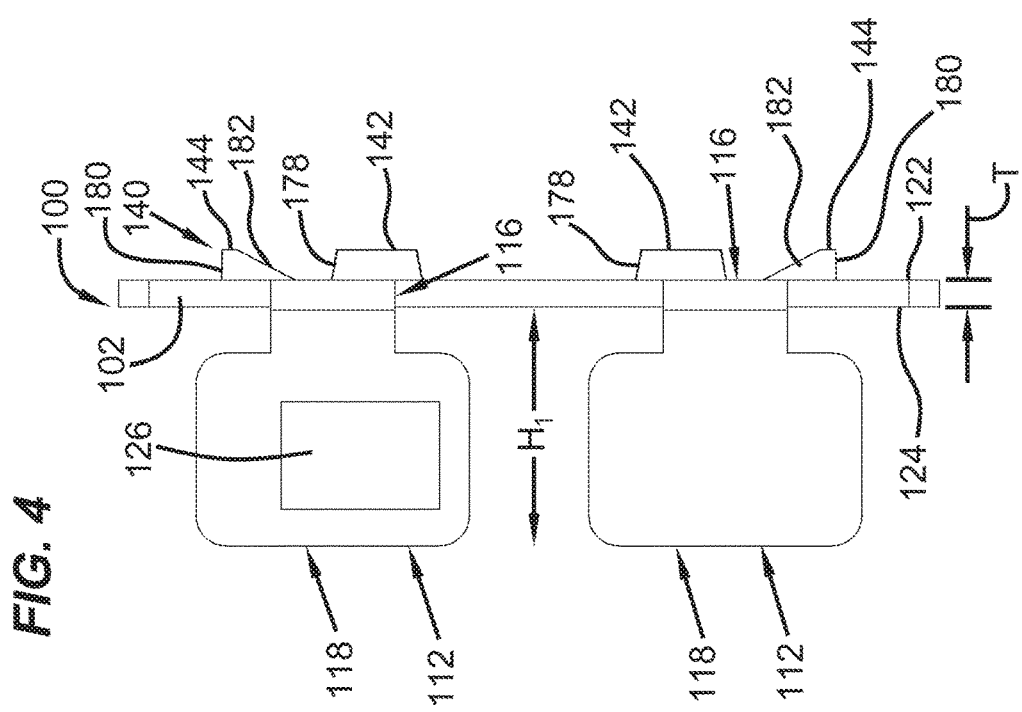
Figure 8:
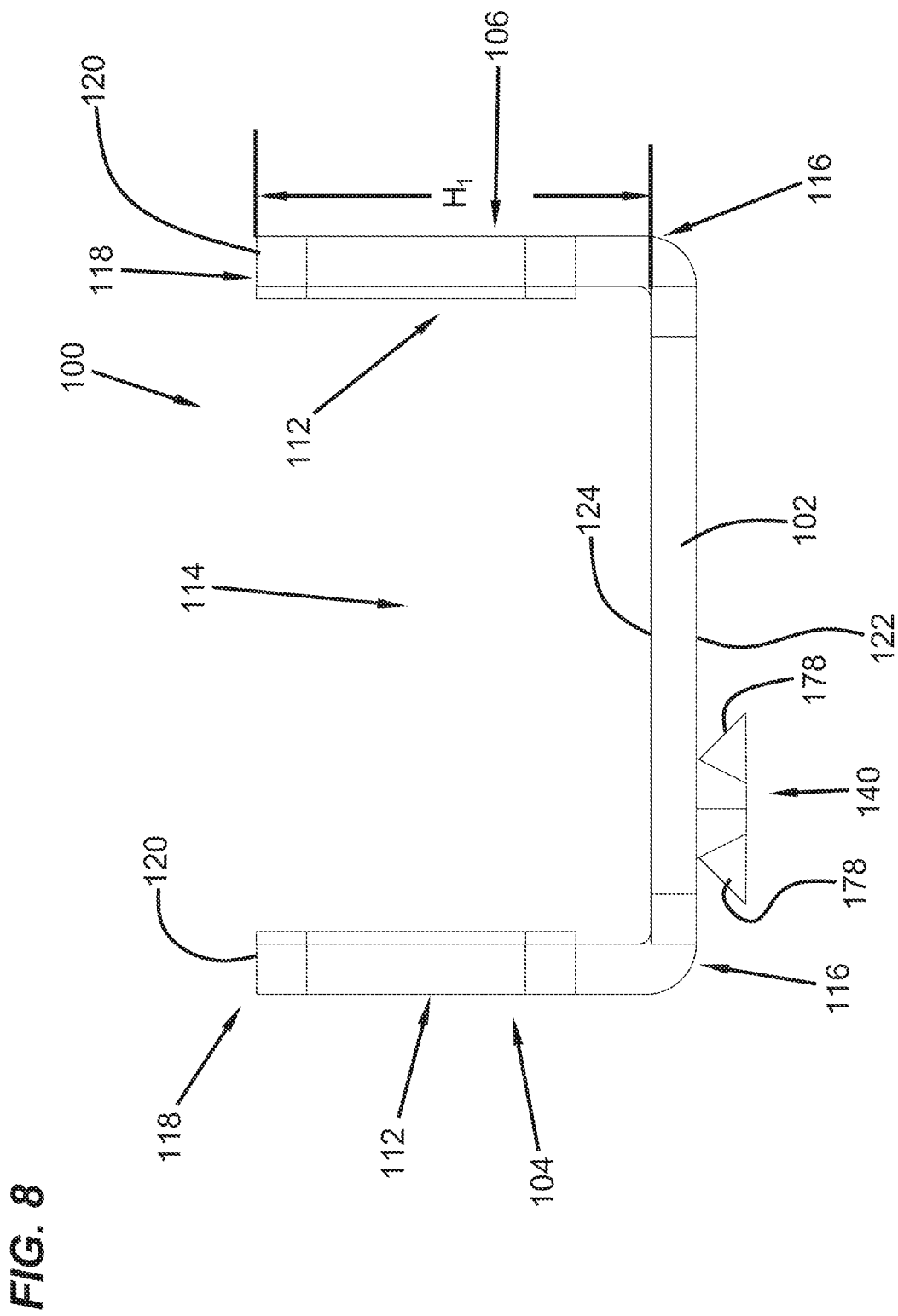
Figure 9:
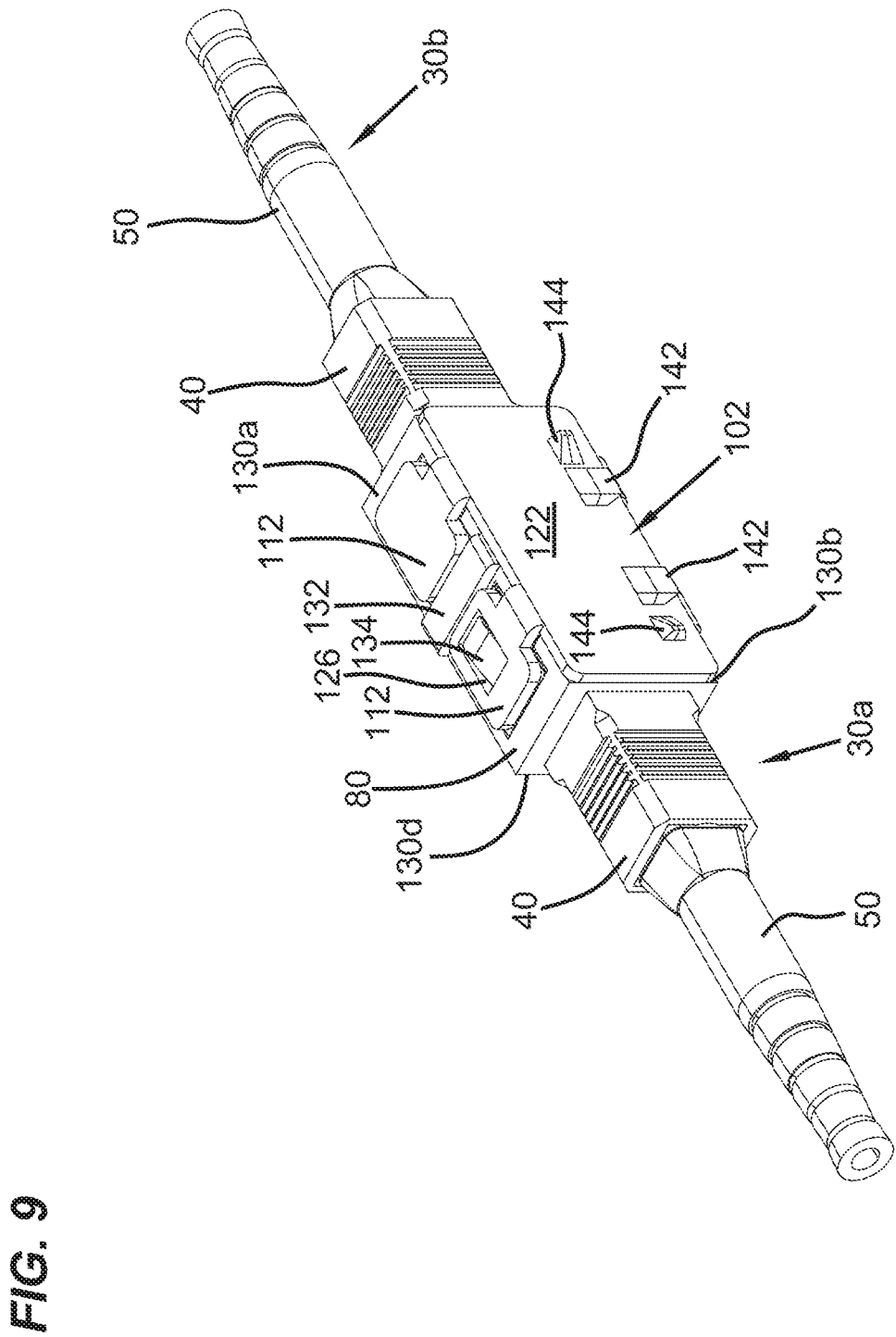
FIGS. 9-12 are multiple views of the fiber optic adapter of FIG. 2 optically coupling together the fiber optic connectors of FIG. 2, the fiber optic adapter is shown mounted within the fiber optic adapter holder of FIGS. 9-13.
Figure 10:
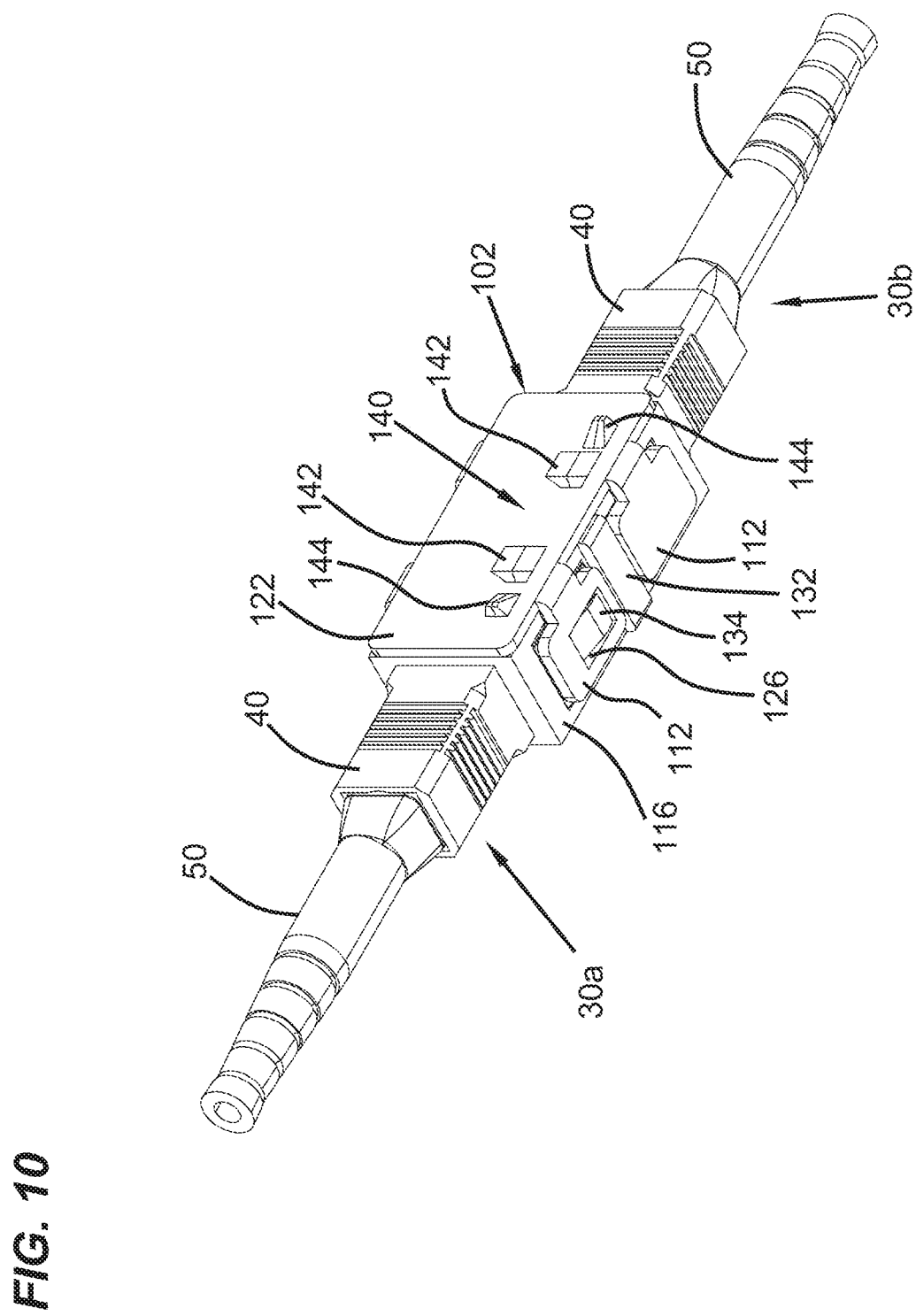
Figure 11:
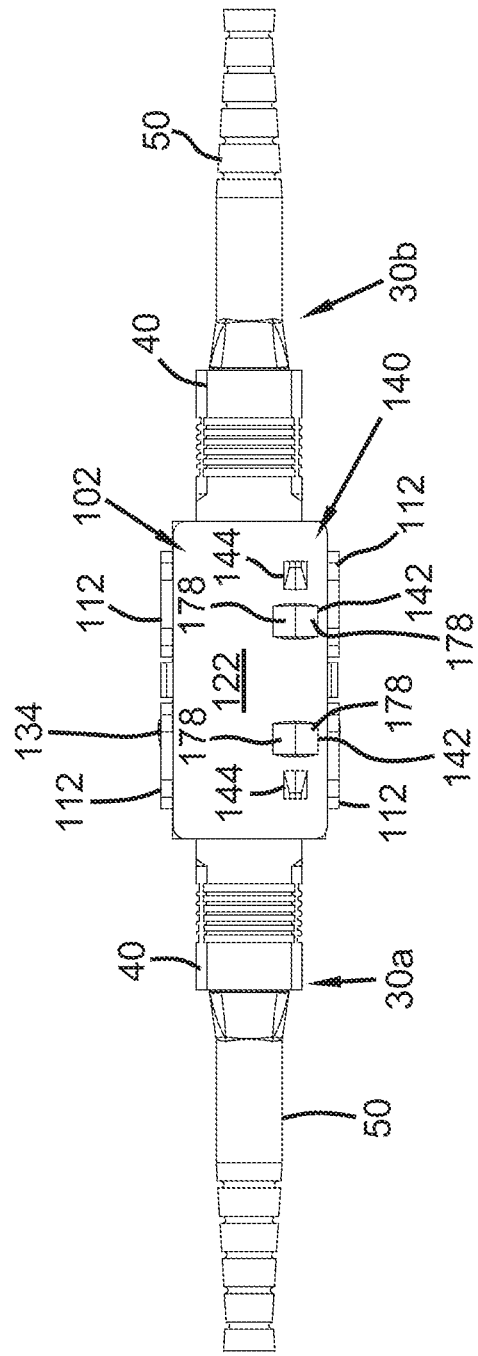
Figure 12:
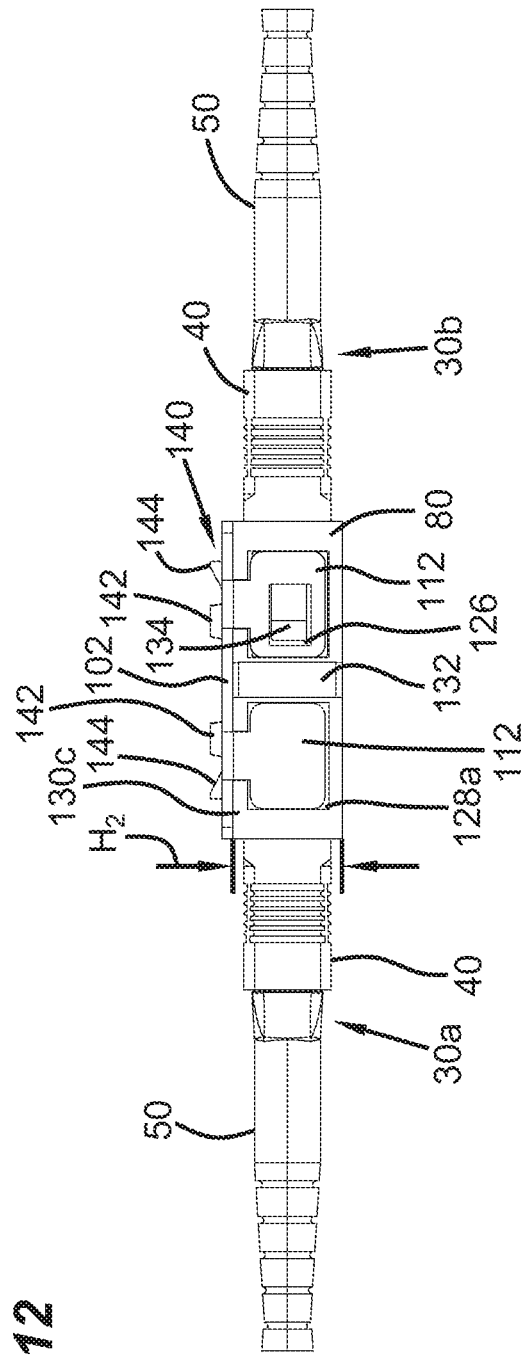
Figure 13:
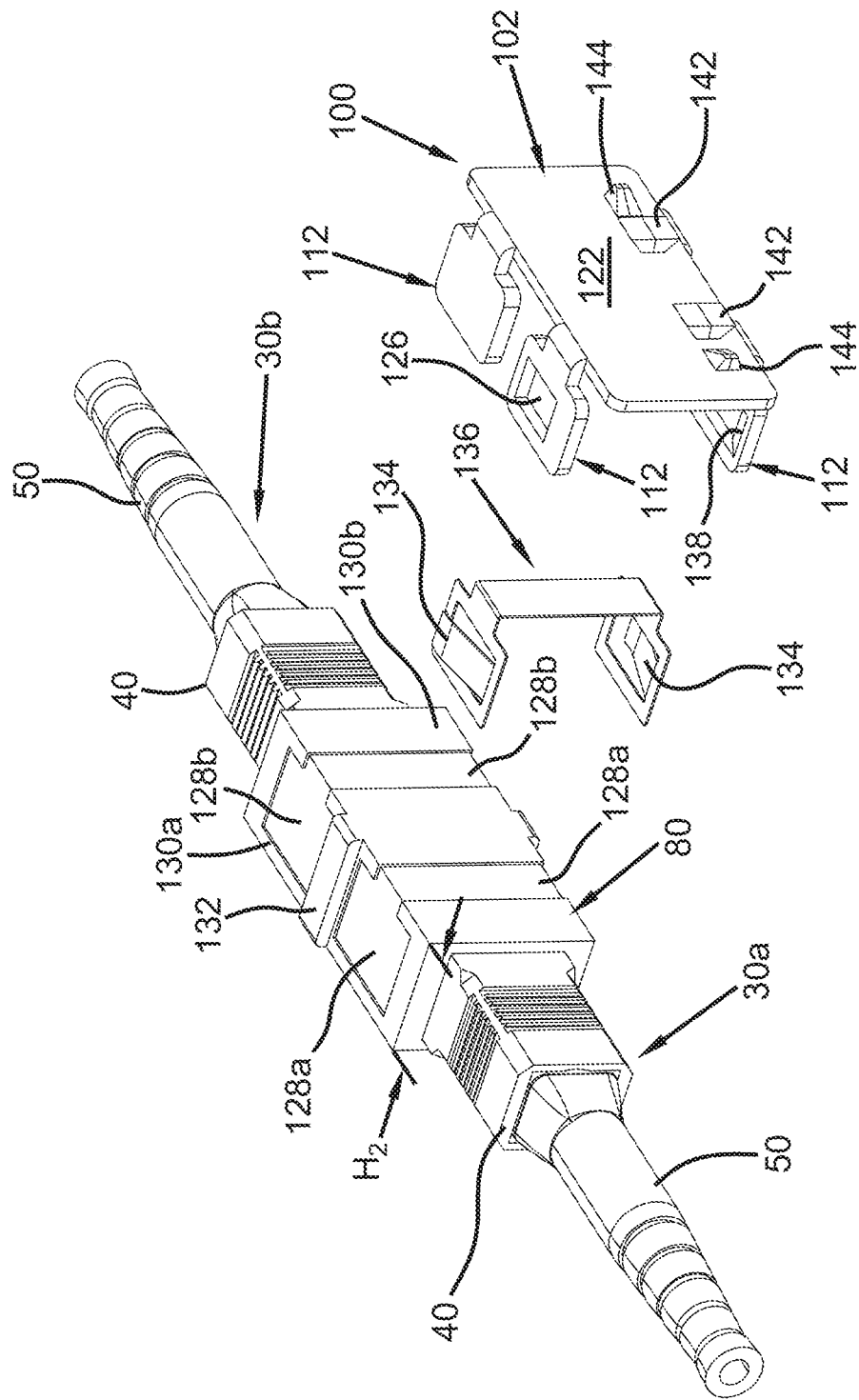
FIG. 13 is an exploded perspective view of FIG. 9.
Figure 14:
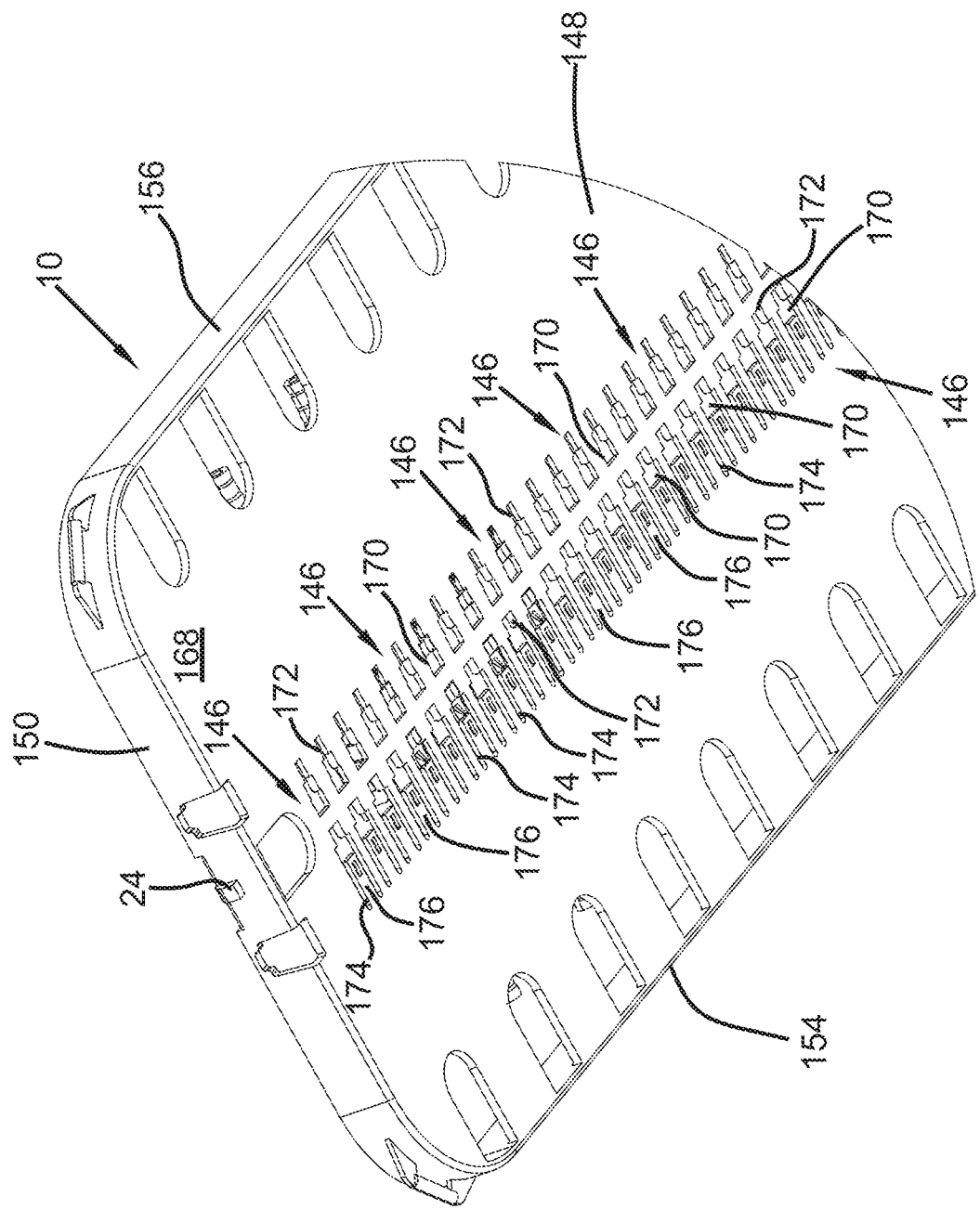
FIG. 14 is a bottom perspective view of the telecommunications equipment of FIG. 3.

FIGS. 2-3 depict a plurality of first and second optical fiber connectors 30a, 30b. The first and second optical fiber connectors 30a, 30b include a housing 40 and a strain relief boot 50. The external surface of the housing 40 includes a longitudinal key 60 (e.g., keying feature) that is sized to be received into a slot 70 (e.g., a keying feature) of a fiber optic adapter 80 when the first and second optical fiber connectors 30a, 30b are inserted into the fiber optic adapter 80. In the example depicted, the optical fiber connectors 30a, 30b are SC-type connectors. However, it should be noted that the SC-type fiber optic adapter 80 described herein represents only one example embodiment of the features of the present disclosure and that the features may be applicable to adapters configured to be used with other types of connectors (e.g., LC, LX, MPO, etc.). The fiber optic adapter 80 may be constructed of plastic or polymeric material. It is contemplated that other materials and injection molding processes may be used for the construction of the fiber optic adapter 80.

Figure 18:
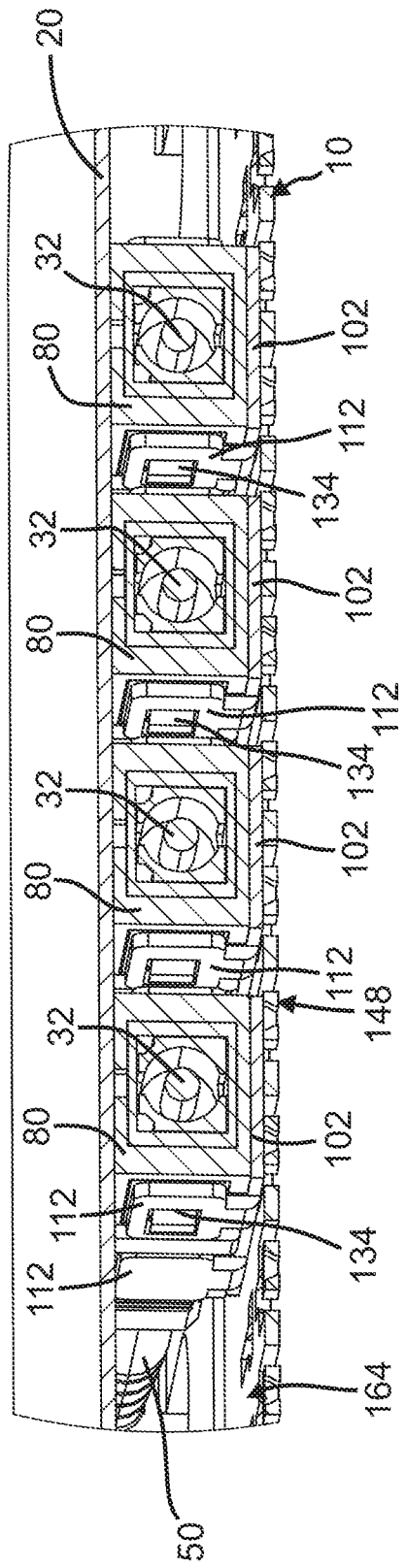
FIG. 18 is a cross-sectional view taken along section line 18-18 of FIG. 5.

The fiber optic adapter 80 can be configured for interconnecting the first and second optical fiber connectors 30a, 30b in coaxial alignment along an optical axis X. The plurality of first and second optical fiber connectors 30a, 30b can each include a generally cylindrical ferrule 32 (see FIG. 18) that holds an end of a bare optical fiber. As used herein, the term, "bare optical fiber" and variants thereof, in this context, means an optical fiber with a core, a cladding layer surrounding the core, and no coating over the cladding layer.

Turning to FIGS. 4-8, an example fiber optic adapter holder 100 is depicted in accordance with the principles of the present disclosure. The fiber optic adapter holder 100 may include a base member 102. In certain examples, the base member 102 may have a first major side 104, a second major side 106 that is generally parallel to the first major side 104, a first minor side 108, and a second minor side 110 oppositely disposed to the first minor side 108. The first minor side 108 and the second minor side 110 may extend generally perpendicularly between the first major side 104 and the second major side 106. The fiber optic adapter holder 100 may be constructed of plastic or polymeric material. It is contemplated that other materials and injection molding processes may be used for the construction of the fiber optic adapter holder 100.

The fiber optic adapter holder 100 may also include a plurality of upright arms 112. In the example shown, there are a total of four upright arms 112, although alternatives are possible. For example, the fiber optic adapter holder 100 may include more or less upright arms 112. For example, two upright arms 112 are possible.

In certain examples, the plurality of upright arms 112 may have spring like properties such that the plurality of upright arms 112 may be flexible enough to engage the fiber optic adapter 80 while maintaining its integrity.

The plurality of upright arms 112 may extend upwardly from the first and second major sides 104, 106 of the base member 102, although alternatives are possible. The plurality of upright arms 112 together define a pocket region 114 (see FIG. 8). The fiber optic adapter holder 100 has an open top. That is, the fiber optic adapter holder 100 has an open, U-shape configuration for receiving the fiber optic adapter 80. Each one of the plurality of upright arms 112 have a proximal end 116 attached to the base member 102 and a distal free end 118. The distal free ends 118 may have an edge 120.

The base member 102 may have a thickness T (see FIG. 4) defined between a first surface 122 (e.g., a bottom surface) of the base member 102 and an opposite, second surface 124 (e.g., top surface) of the base member 102. A height $H_1$ (see FIGS. 4 and 8) of the fiber optic adapter holder 100 may be defined between the second surface 124 of the base member 102 and the edge 120 of the distal free ends 118 of the plurality of upright arms 112. When the fiber optic adapter 80 is mounted within the pocket region 114 of the fiber optic adapter holder 100 as shown in FIGS. 9-12, the height $H_1$ of the fiber optic adapter holder 100 is lower than a height $H_2$ (see FIG. 12) of the fiber optic adapter 80.

Alternatively, when the fiber optic adapter 80 is mounted within the pocket region 114 of the fiber optic adapter holder 100, the height $H_1$ of the fiber optic adapter holder 100 may be equal to the height $H_2$ of the fiber optic adapter 80.

In certain examples, when the fiber optic adapter 80 is mounted within the pocket region 114 of the fiber optic adapter holder 100, the height $H_1$ of the fiber optic adapter holder 100 is at least one of lower than the height $H_2$ of the fiber optic adapter 80 and equal to the height $H_2$ of the fiber optic adapter 80. That is, when the fiber optic adapter 80 is mounted within the pocket region 114 of the fiber optic adapter holder 100, the height $H_1$ of the fiber optic adapter holder 100 may be only lower than the height $H_2$ of the fiber optic adapter 80; the height $H_1$ of the fiber optic adapter holder 100 may be only equal to the height $H_2$ of the fiber optic adapter 8; or the height $H_1$ of the fiber optic adapter holder 100 may be both lower than and equal to the height $H_2$ of the fiber optic adapter 80.

Turning to FIGS. 9-12, the fiber optic adapter 80 and first and second fiber optic connectors 30a, 30b are shown mounted within the fiber optic adapter holder 100. Because the fiber optic adapter holder 100 has an open, u-shaped top, the fiber optic adapter 80 may be mounted within the fiber optic adapter holder 100 by mounting the fiber optic adapter 80 through the open, u-shaped top into the pocket region 114 of the fiber optic adapter holder 100. That is, the fiber optic adapter 80 may be placed into the fiber optic adapter holder 100 from the open top of the fiber optic adapter holder 100.

The fiber optic adapter 80 may be mounted into the fiber optic adapter holder 100 by sliding in from an end of the fiber optic adapter holder 100. Mounting the fiber optic adapter 80 into the fiber optic adapter holder 100 from a side is not necessary because the fiber optic adapter holder 100 is not enclosed about 360 degrees (i.e., a fiber optic adapter holder that is fully enclosed about 360 degrees has no open top).

When the fiber optic adapter 80 is mounted within the fiber optic adapter holder 100, the height $H_2$ of the fiber optic adapter 80 is taller than the height $H_1$ of the fiber optic adapter holder 100 such that there is no structure on top or above the fiber optic adapter 80. As such, the fiber optic adapter holder 100 does not add any structure to the total or overall height $H_2$ of the fiber optic adapter 80.

In some examples, height this equal to height $H_1$.

In still further examples, height $H_2$ is shorter than height $H_1$, to take advantage of the drop in mounting system that does not require pushing an adapter axially.

At least two of the plurality of upright arms 112 of the fiber optic adapter holder 100 may define a window opening 126 and at least two of the plurality of upright arms 112 may be solid (i.e., no window opening). When the fiber optic adapter 80 is mounted within the pocket region 114 of the fiber optic adapter holder 100, the plurality of upright arms 112 of the fiber optic adapter holder 100 may be configured to be positioned in cutouts 128 (e.g., recesses, pockets) defined in the fiber optic adapter 80. That is, the fiber optic adapter holder 100 includes adapter housing side walls 130 (e.g., exterior walls). In certain examples, the adapter housing side walls 130 may include a first side wall 130a, a second side wall 130b, a third side wall 130c, and a fourth side wall 130d. The first and second cutouts 128a, 128b may be defined in at least the first, second, and third side walls 130a-c.

The fiber optic adapter 80 may include a flange 132 for mounting or capturing the fiber optic adapter 80 to or against a structure (e.g., dividing wall, telecommunications equipment, panel, etc.). For example, the fiber optic adapter 80 may be used with a panel aperture where the flange 132 may serve as a stop when the fiber optic adapter 80 is pushed through an opening (e.g., hole, aperture) defined by a bulkhead structure or panel. That is, the flange 132 may help to prevent the fiber optic adapter 80 from being pushed too far into the bulkhead structure or panel. In certain examples, the first and second cutouts 128a, 128b may be positioned on opposing sides of the flange 132.

The first and second cutouts 128a, 128b may also be adapted to receive a pair of retaining clips 134 (e.g., cantilever wings, cantilever clips, spring arms, latch arms) of a clip 136. The clip 136 may be formed of a metallic material. The clip 136 may be mounted to the adapter housing side walls 130 of the fiber optic adapter 80 such that the retaining clips 134 can be positioned on opposite sides of the fiber optic adapter 80 and can be received within one of the first and second cutouts 128a, 128b thereof. The clip 136 may be positioned on the adapter housing side walls 130a-c of the fiber optic adapter 80 such that the pair of retaining clips 134 may at least partially deflect into the first and second cutouts 128a, 128b of the fiber optic adapter 80.

Also, when the fiber optic adapter 80 is mounted within the fiber optic adapter holder 100, the plurality of upright arms 112 may flex to allow the fiber optic adapter 80 to mount therein. As such, the retaining clips 134 may be positioned to be received within the window openings 126 of respective upright arms 112. The window openings 126 of the respective upright arms 112 may include a chamfer surface 138. The chamfer surface 138 may engage the retaining clips 134 to hold the retaining clips 134 in place or prevent the retaining clips 134 from reversing direction. The retaining clips 134 may be adapted to help secure the fiber optic adapter 80 and the fiber optic adapter holder 100 together. That is, the retaining clips 134 may provide integrity to help prevent the fiber optic adapter holder 100 from disengaging with the fiber optic adapter 80.

To accommodate the thickness of the retaining clips 134, the upright arms 112 with window openings 126 are thinner than the upright arms without the window openings 126, in one embodiment.

The fiber optic adapter holder 100 may also include a mounting feature 140 located on the first surface 122 of the base member 102. In the example depicted, the mounting feature 140 includes dovetail structures 142. In a preferred example, the mounting feature 140 may also include a bump 144 (e.g., ridge), although alternatives are possible. In the example shown, the mounting feature 140 is positioned offset from a center of the base member 102, although alternatives are possible. In certain examples, the mounting feature 140 may be centrally located on the base member 102. The advantageous feature of having an offset position provides for improved density of fiber optic adapters 80 that can be mounted to a structure, such as the telecommunications equipment 10. In this case holder 100 covers two mounting locations 146, with the dovetail structures 142 mounted to one mounting location 146.

Turning to FIGS. 14-18, the telecommunications equipment 10 may define a plurality of mounting locations 146 (e.g., retention openings). The telecommunications equipment 10 may include a base 148, a rear side 150 and a front side 152 that extend between opposite first and second sides 154, 156. The base 148 of the telecommunications equipment 10 may define the plurality of mounting locations 146. The first and second sides 154, 156 may function to define a cable routing pathway 158 (see FIG. 3). Cables can be further retained within the cable routing pathway 158 via a plurality of cable guides 160 located at a top of the telecommunications equipment 10. The plurality of cable guides 160 may be positioned at the rear, first, and second sides 150, 154, 156 of the telecommunications equipment 10.

The telecommunications equipment 10 may include support arms 162 that may be adapted for mounting the telecommunications equipment 10 to a chassis, panel, or other structure. In certain examples, the support arms 162 may allow the telecommunications equipment 10 to be pivotally mounted, although alternatives are possible.

The fiber optic adapter holder 100 may be configured to mount in the mounting locations 146 of the telecommunications equipment 10 via the mounting features 140. The mounting locations 146 may be configured in a recess region 164 (see FIG. 3) of the base 148 of the telecommunications equipment 10, although alternatives are possible. The recess region 164 thins down the base 148 of the telecommunications equipment 10. In one example, the recess region 164 of the base 148 has a thickness of about 1 mm, although alternatives are possible. Other parts of the telecommunications equipment 10 may be thicker without having to change the dovetail structures 142 sized for the 1 mm thickness. The mounting locations 146 may extend through the base 148 of the telecommunications equipment 10 from a first side 166 (see FIG. 3) to an opposite, second side 168 thereof.

In certain examples, the mounting locations 146 may include a T-shaped slots that have first portions 170 and second portions 172, although alternatives are possible. The first portions 170 of the T-shaped slots have a larger cross-dimension than a cross-dimension of the second portions 172 of the T-shaped slot. When the fiber optic adapter holder 100 is mounted to the telecommunications equipment 10 at the recess region 164, the dovetail structures 142 of the mounting feature 140 of the fiber optic adapter holder 100 have dovetail cross-sectional profiles that mate with a corresponding dovetail cross-section profile defined by the second portions 172 of the mounting locations 146 defined in the telecommunications equipment 10.

The mounting locations 146 may also include slots 174 that have a cantilever tab 176 (e.g., cantilever flange) arranged and configured to flex when the fiber optic adapter holder 100 is mounted at the mounting locations 146. The dovetail structures 142 may include ramped surfaces 178 (see FIG. 5) that tapers narrowly in a direction towards the first surface 122 of the base 148. That is, when the fiber optic adapter holders 100 are mounted at the mounting locations 146 of the telecommunications equipment 10, the dovetail structures 142 may drop down into the first portions 170 of the mounting locations 146 while the bumps 144 may be configured to push the cantilever tab 176 downwardly and away from the dovetail structures 142 upon insertion into the second portion 172 of the T-shape slot and be slid therein. The bumps 144 may also include a 90-degree side 180 (see FIG. 4) relative to the base member 102 of the fiber optic adapter holder 100 and opposite to the 90-degree side 180 of the bumps 144 is a ramped surface 182 (see FIG. 4). The 90-degree side 180 of the bumps 144 may help to prevent the dovetail structures 142 from backing out or reversing out of the first portions 170 of the mounting locations 146. That is, when the bumps 144 engage the cantilever tab 176 to push it down while the fiber optic adapter holder 100 is being inserted into the mounting location 146, the cantilever tab 176 snaps back against the 90-degree side 180 to create a stop.

With the fiber optic adapter holder 100 mounted to the telecommunications equipment 10, there is no additional structure added to the overall height $H_2$ of the fiber optic adapter 80 above the top surface in the preferred embodiment.

The fiber optic adapter holder 100 may be mounted to the telecommunications equipment 10 such that the base member 102 of the fiber optic adapter holder 100 occupies or covers two mounting locations 146, although alternatives are possible. That is, the base member 102 of the fiber optic adapter holder 100 may be wide enough to cover at least two mounting locations 146. In one example, the telecommunications equipment 10 may include six mounting locations 146. The six mounting locations 146 may provide area for three fiber optic adapter holders 100 to be mounted thereon. As such, by having the mounting features 140 of the fiber optic adapter holder 100 in an offset configuration, extra mounting locations 146 are not necessary to accommodate the number of fiber optic adapters 80 used.

Also, the fiber optic adapter holders 100 may be mounted to the telecommunications equipment 10 with increased density. As such, a plurality of fiber optic adapter holders 100 may be mountable to the telecommunications equipment 10 in a side-by-side arrangement. In certain examples, the fiber optic adapter holders 100 may abut against structure (e.g., wall) of the telecommunications equipment 10.

The telecommunications equipment 10 is shown in the form of a tray. The telecommunications equipment 10 can also be in the form of a generally planar panel useable by itself or mountable to other structures, with one or more mounting locations 146. In some examples, the telecommunications equipment 10 can be made to include arms 112 extending upwardly from a base portion of the telecommunications equipment 10.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. A fiber optic adapter holder assembly, comprising:
 a fiber optic adapter holder, including:
 a base member, the base member including:
 a first major side;
 a second major side generally parallel to the first major side;
 a first minor side; and
 a second minor side oppositely disposed to the first minor side,
 wherein the first minor side and the second minor side extend generally perpendicularly between the first major side and the second major side, the base member also including a first surface and an opposite, second surface; and
 a plurality of upright arms extending upwardly from the first and second major sides of the base member, the plurality of upright arms together defining a pocket region having an open, U-shape for receiving a fiber optic adapter, each one of the plurality of upright arms having a proximal end attached to the base member and a distal free end, the distal free ends having an edge, a height of the fiber optic adapter holder being defined between the second surface of the base member and the edge of the distal free ends of the plurality of upright arms; and
 a fiber optic adapter, wherein the fiber optic adapter holder and the fiber optic adapter are configured such that when the fiber optic adapter is mounted within the pocket region of the fiber optic adapter holder, the height of the fiber optic adapter holder is lower than or equal to a height of the fiber optic adapter such that no portion of the fiber optic adapter holder extends above the fiber optic adapter.

2. The fiber optic adapter holder assembly of claim 1, wherein when the fiber optic adapter is mounted within the pocket region of the fiber optic adapter holder, the plurality of upright arms of the fiber optic adapter holder are configured to be positioned in recesses defined in the fiber optic adapter.

3. The fiber optic adapter holder assembly of claim 1, wherein the fiber optic adapter is adapted for interconnecting first and second optical fiber connectors in coaxial alignment along an optical axis.

4. The fiber optic adapter holder assembly of claim 1, further comprising a mounting feature on a bottom surface of the base member.

5. The fiber optic adapter holder assembly of claim 4, wherein the mounting feature includes dovetail structures.

6. The fiber optic adapter holder assembly of claim 4, further comprising a structure, wherein the fiber optic adapter holder is mounted to the structure via the mounting feature.

7. The fiber optic adapter holder assembly of claim 6, wherein the structure is a fiber management tray.

8. The fiber optic adapter holder assembly of claim 6, wherein the structure defines a first side and an opposite second side, the structure also defining retention openings that extend through the structure from the first side to the second side, the retention openings including T-shaped slots that each have a first portion and a second portion.

9. The fiber optic adapter holder assembly of claim 8, wherein the first portions of the T-shaped slots have larger cross-dimensions than cross-dimensions of the second portions of the T-shaped slots.

10. The fiber optic adapter holder assembly of claim 8, wherein the mounting feature has dovetail cross-sectional profiles that mate with corresponding dovetail cross-sectional profiles defined by the first portions of the retention openings.

11. The fiber optic adapter holder assembly of claim 8, wherein the mounting feature also includes ridges that mount within the second portions of the retention openings.

12. The fiber optic adapter holder assembly of claim 1, further comprising a plurality of fiber optic adapter holders mountable to a structure in a side-by-side arrangement.

13. A fiber optic adapter holder assembly, comprising:
a fiber optic adapter holder, including:
a base member, the base member including:
a first major side;
a second major side generally parallel to the first major side;
a first minor side; and
a second minor side oppositely disposed to the first minor side,
wherein the first minor side and the second minor side extend generally perpendicularly between the first major side and the second major side, the base member also including a first surface and an opposite, second surface; and
a plurality of upright arms extending upwardly from the first and second major sides of the base member, the plurality of upright arms together defining a pocket region having an open, U-shape for receiving a fiber optic adapter, each one of the plurality of upright arms having a proximal end attached to the base member and a distal free end, the distal free ends having an edge, a height of the fiber optic adapter holder being defined between the second surface of the base member and the edge of the distal free ends of the plurality of upright arms; and
a fiber optic adapter, wherein the fiber optic adapter holder and the fiber optic adapter are configured such that when the fiber optic adapter is mounted within the pocket region of the fiber optic adapter holder, the height of the fiber optic adapter holder is lower than or equal to a height of the fiber optic adapter,
wherein at least two of the plurality of upright arms each define a window opening for receiving outer retaining clips respectively located on the fiber optic adapter.

14. The fiber optic adapter holder assembly of claim 13, wherein the window openings each include a chamfer surface to respectively hold the outer retaining clips in place.

15. The fiber optic adapter holder assembly of claim 13, wherein the outer retaining clips provide integrity for securing the fiber optic adapter to the fiber optic adapter holder.

16. A fiber optic adapter holder assembly comprising:
a fiber optic adapter holder including:
a base member, the base member including:
a first major side;
a second major side generally parallel to the first major side;
a first minor side; and
a second minor side oppositely disposed to the first minor side, the base member also including a first surface and an opposite, second surface; and
a plurality of upright arms extending upwardly from the first and second major sides of the base member, each one of the plurality of upright arms having free ends, a height of the fiber optic adapter holder being defined between the second surface of the base member and the free ends of the plurality of upright arms;
a fiber optic adapter mounted within a pocket region of the fiber optic adapter holder, the pocket region of the fiber optic adapter holder defining an open, U-shape, wherein the height of the fiber optic adapter holder is lower than or equal to a height of the fiber optic adapter; and
a structure, wherein the fiber optic adapter holder is mounted to the structure via a mounting feature,
wherein at least two of the plurality of upright arms each define a window opening for receiving outer retaining clips respectively located on the fiber optic adapter.

17. The fiber optic adapter holder assembly of claim 16, wherein when the fiber optic adapter is mounted within the pocket region of the fiber optic adapter holder, the plurality of upright arms of the fiber optic adapter holder are configured to be positioned in recesses defined in the fiber optic adapter.

18. A method of retaining a fiber optic adapter, the method comprising:
providing a one-piece fiber optic adapter holder, the fiber optic adapter holder including a base member, the base member including a first major side, a second major side generally parallel to the first major side, a first minor side, and a second minor side oppositely disposed to the first minor side, wherein the first minor side and the second minor side extend generally perpendicularly between the first major side and the second major side, the base member also including a first surface and an opposite, second surface, the fiber optic adapter holder also including a plurality of upright arms extending upwardly from the first and second major sides of the base member, each one of the plurality of upright arms having a proximal end attached to the base member and a distal free end, the distal free end having an edge, a height of the fiber optic adapter holder being defined between the second surface of the base member and the edge of the distal free ends of the plurality of upright arms, the plurality of upright arms together defining a pocket region having an open, U-shape;

mounting a fiber optic adapter within the pocket region of the fiber optic adapter holder, wherein when the fiber optic adapter is mounted to the fiber optic adapter holder, a length of the fiber optic adapter extends between the first and second minor sides of the base member, and a height of the fiber optic adapter extends above or is equal to the height of the fiber optic adapter holder; and securing the fiber optic adapter holder to a structure via mounting features, wherein the step of mounting the fiber optic adapter within the pocket region of the fiber optic adapter holder includes positioning the plurality of upright arms in recesses defined in the fiber optic adapter; and wherein at least two of the plurality of upright arms each define a window opening for receiving outer retaining clips respectively located on the fiber optic adapter.

\* \* \* \* \*